US009729223B2

(12) United States Patent
Jeong et al.

(10) Patent No.: US 9,729,223 B2
(45) Date of Patent: *Aug. 8, 2017

(54) METHOD AND APPARATUS FOR TRANSMITTING AND RECEIVING CHANNEL QUALITY INFORMATION IN A WIRELESS COMMUNICATION SYSTEM

(71) Applicant: Samsung Electronics Co., Ltd., Gyeonggi-do (KR)

(72) Inventors: Kyeong-In Jeong, Gyeonggi-do (KR); Soeng-Hun Kim, Gyeonggi-do (KR); Sung-Ho Choi, Gyeonggi-do (KR); O-Sok Song, Gyeonggi-do (KR); Gert-Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 137 days.

This patent is subject to a terminal disclaimer.

(21) Appl. No.: 14/624,242

(22) Filed: Feb. 17, 2015

(65) Prior Publication Data
US 2015/0162967 A1    Jun. 11, 2015

Related U.S. Application Data

(63) Continuation of application No. 11/788,899, filed on Apr. 23, 2007, now Pat. No. 9,002,293.

(30) Foreign Application Priority Data

Apr. 21, 2006    (KR) .................. 10-2006-0036444

(51) Int. Cl.
  *H04B 1/00*    (2006.01)
  *H04B 7/00*    (2006.01)
  (Continued)

(52) U.S. Cl.
  CPC ......... *H04B 7/0632* (2013.01); *H04L 5/0053* (2013.01); *H04L 5/0057* (2013.01);
  (Continued)

(58) Field of Classification Search
  CPC ... H04W 52/44; H04W 28/06; H04W 52/286; H04W 72/04; H04W 52/0216;
  (Continued)

(56) References Cited

U.S. PATENT DOCUMENTS 7,768,966 B2    8/2010  Yoon et al.
7,966,017 B2 *  6/2011  Kim ...................... H04W 36/08
                                                370/328
(Continued)

FOREIGN PATENT DOCUMENTS

CN    1674701    9/2005
EP    1 309 121  5/2003
(Continued)

OTHER PUBLICATIONS

InterDigital: "Scheduling and Multiplexing of CQI and ACK/NACK Feedback for Single Carrier FDMA in Evolved UTRA Uplink", R1-060155.
(Continued)

Primary Examiner — Allahyar Kasraian
(74) Attorney, Agent, or Firm — The Farrell Law Firm, P.C.

(57) ABSTRACT

A method and apparatus for transmitting and receiving CQI in a wireless communication system are provided. The method includes receiving, by a mobile station, CQI report resource information, CQI period information, and Discontinuous Reception (DRX) cycle information; discontinuously monitoring, by the mobile station, a channel based on the DRX cycle information; and reporting a CQI to a network, based on the CQI report resource information, the CQI period information, and the DRX cycle information

16 Claims, 7 Drawing Sheets

(51) Int. Cl.
  *H04W 24/10* (2009.01)
  *H04B 7/06* (2006.01)
  *H04W 76/04* (2009.01)
  *H04W 52/02* (2009.01)
  *H04L 5/00* (2006.01)
  *H04W 72/04* (2009.01)

(52) U.S. Cl.
  CPC ........... *H04L 5/0085* (2013.01); *H04W 24/10* (2013.01); *H04W 52/0216* (2013.01); *H04W 76/048* (2013.01); *H04L 5/0007* (2013.01); *H04W 72/04* (2013.01); *Y02B 60/50* (2013.01)

(58) Field of Classification Search
  CPC ........... H04W 52/0245; H04W 52/325; H04W 52/028; H04W 52/146; H04W 52/223; H04W 52/24; H04W 52/262; H04L 1/0026; H04L 1/20; H04L 1/0001
  USPC .... 455/24, 68, 69, 154.1, 158.1, 158.2, 450, 455/452.1, 452.2
  See application file for complete search history.

(56) References Cited

U.S. PATENT DOCUMENTS

| | | |
|---|---|---|
| 2004/0004954 A1 | 1/2004 | Terry et al. |
| 2004/0127221 A1 | 7/2004 | Takano et al. |
| 2004/0203819 A1 | 10/2004 | Das et al. |
| 2005/0191965 A1* | 9/2005 | Yu .................. H04L 1/0026 455/67.16 |
| 2005/0207367 A1 | 9/2005 | Onggosanusi et al. |
| 2005/0215259 A1 | 9/2005 | Cheng |
| 2005/0233754 A1 | 10/2005 | Beale |
| 2007/0097981 A1 | 5/2007 | Papasakellariou |
| 2007/0177569 A1 | 8/2007 | Lundby |
| 2007/0183355 A1 | 8/2007 | Kuchibhotla et al. |
| 2009/0285144 A1 | 11/2009 | Motegi et al. |
| 2010/0220606 A1 | 9/2010 | Niwano |

FOREIGN PATENT DOCUMENTS

| | | |
|---|---|---|
| EP | 1 499 144 | 1/2005 |
| JP | 2001-094505 | 4/2001 |
| JP | 2003-319467 | 11/2003 |
| JP | 2004-147050 | 5/2004 |
| JP | 2007-081574 | 3/2007 |
| WO | WO 2005/006829 | 1/2005 |
| WO | WO 2005/060132 | 6/2005 |
| WO | WO 2005/074312 | 8/2005 |
| WO | WO 2005/091541 | 9/2005 |
| WO | WO 2006/019244 | 2/2006 |

OTHER PUBLICATIONS

TSG-RAN WG1 WG1 LTE Ad Hoc Meeting, Jan. 23-25, 2006.
Chinese Office Action dated Dec. 3, 2014 issued in counterpart application No. 201210102017.9.

* cited by examiner

METHOD AND APPARATUS FOR TRANSMITTING AND RECEIVING CHANNEL QUALITY INFORMATION IN A WIRELESS COMMUNICATION SYSTEM

PRIORITY

This application is a Continuation of U.S. Ser. No. 11/788,899, which was filed in the U.S. Patent and Trademark Office on Apr. 23, 2007, and claims priority under 35 U.S.C. § 119(a) to Korean Patent Application Serial No. 10-2006-0036444, which was filed in the Korean Intellectual Property Office on Apr. 21, 2006, the entire disclosure of each of which is hereby incorporated by reference.

BACKGROUND OF THE INVENTION

1. Field of the Invention

The present invention generally relates to a method and apparatus for transmitting and receiving Channel Quality Information (CQI) in a wireless communication system. More particularly, the present invention relates to a method and apparatus for transmitting and receiving CQI when a User Equipment (UE) transitions between reception states.

2. Description of the Related Art

In general, wireless communication systems have evolved from voice service to data service. The evolution of the wireless communication systems is a driving force behind the increase in the number of subscribers in number and an ever-increasing user demand for transmission of larger amounts of data. The wireless communication systems provide services using a variety of multiplexing schemes according to resource types. In other words, the wireless communication systems are classified according to their multiplexing schemes. The provisioning of voice service and/or data service to multiple users by multiplexing is referred to as a multiple access scheme. Herein, both a multiplexing scheme and a multiple access scheme are referred to as a multiplexing scheme without distinction between them.

Major multiplexing schemes are Time Division Multiplexing (TDM), Code Division Multiplexing (CDM), and Orthogonal Frequency Division Multiplexing (OFDM). The most widespread one of them is CDM which can operate in a synchronous or asynchronous mode. Because CDM relies on codes, limited orthogonal codes lead to resource shortage. In this context, OFDM has emerged as promising. OFDM is a special case of Multi-Carrier Modulation (MCM) in which a serial symbol sequence is parallelized and modulated to mutually orthogonal subcarriers, i.e. subcarrier channels, prior to transmission. OFDM, similar to FDM, boasts of optimum transmission efficiency in high-speed data transmission because it transmits data on subcarriers, while maintaining orthogonality among the subcarriers. Efficient frequency use attributed to overlapping frequency spectrums and robustness against frequency selective fading and multi-path fading add to the transmission efficiency in high-speed data transmission.

To exploit the features of OFDM, the $3^{rd}$ Generation Partnership Project (3GPP) standardization body has proposed 3GPP Long Term Evolution (LTE) in order to enable high-speed data transmission in OFDM. Aside from the OFDM features, 3GPP LTE seeks to achieve other goals including network configuration optimization, signaling optimization, and fast call setup.

Most obstacles to high-speed, high-quality data service in wireless communications are created by the channel environment. A major channel environment condition that impedes wireless communications is Additive White Gaussian Noise (AWGN). Besides AWGN, the channel environment becomes poor in view of a fading-incurred power change of a received signal, shadowing, Doppler effect caused by the movement of a UE and a frequent change in mobile velocity, and interference from other users and multipath signals. Accordingly, it is critical to effectively overcome the obstacles to provide high-speed, high-quality data service.

One of the more significant methods for overcoming fading in the OFDM system is Adaptive Modulation and Coding (AMC). AMC adapts a modulation and coding scheme to a DownLink (DL) channel change. A UE generates CQI of the downlink by measuring the Signal-to-Noise Ratio (SNR) of a received signal and feeds back the CQI to a Node B on the uplink. The Node B estimates the downlink channel state based on the CQI and selects a modulation and coding scheme according to the channel state. When the AMC scheme is adopted, the Node B applies a high-order modulation scheme and a high coding rate in the case of a relatively good channel state, and a low-order modulation scheme and a low coding rate in the case of a relatively bad channel state. Compared to a conventional technology relying on fast power control, the AMC scheme increases the average performance of a system by increasing adaptability to a time-variant channel environment.

Services in a wireless communication system can be classified into continuous services such as voice service and discontinuous services such as data service. For the continuous services, the Node B and the UE keep a data channel connected between them and, to do so, they retain a predetermined control channel. On the other hand, maintaining a data channel and a control channel for the discontinuous services results in resource dissipation. Accordingly, there exists a need for a method for efficiently using limited resources by adjusting a channel connection state according to a data flow state.

SUMMARY OF THE INVENTION

The present invention has been made to address at least the problems and/or disadvantages described herein and to provide at least the advantages described below.

Accordingly, an aspect of the present invention is to provide an apparatus and method for efficiently allocating resources in a wireless communication system.

Moreover, an aspect of the present invention is to provide an apparatus and method for reducing signaling overhead when a state transition occurs in a wireless communication system.

In accordance with an aspect of the present invention, a method is provided for transmitting CQI in a wireless communication system. The method includes receiving, by a mobile station, CQI report resource information, CQI period information, and Discontinuous Reception (DRX) cycle information; discontinuously monitoring, by the mobile station, a channel based on the DRX cycle information; and reporting a CQI to a network, based on the CQI report resource information, the CQI period information, and the DRX cycle information.

In accordance with another aspect of the present invention, a method is provided for receiving CQI in a wireless communication system. The method includes transmitting, by a network, CQI report resource information, CQI period information, and DRX cycle information; and receiving, by the network, a CQI from a mobile station, based on the CQI report resource information, the CQI period information, and the DRX cycle information.

In accordance with another aspect of the present invention, an apparatus is provided for transmitting CQI in a wireless communication system. The apparatus includes a transceiver configured to receive CQI report resource information, CQI period information, and DRX cycle information, and to report a CQI to a network, based on the CQI report resource information, the CQI period information, and the DRX cycle information; and a controller configured to discontinuously monitor a channel, based on the DRX cycle information, and to control the transceiver.

In accordance with another aspect of the present invention, an apparatus is provided for receiving CQI in a wireless communication system. The apparatus includes a transceiver configured to transmit CQI report resource information, CQI period information, and DRX cycle information, and to receive a CQI from a mobile station based on the CQI report resource information, the CQI period information, and the DRX cycle information; and a controller configured to control the transceiver.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The channel connection state can be adjusted by transitions between a continuous channel reception state and a periodic channel reception state based on Discontinuous Reception (DRX). When a transition occurs between these two states, radio resource reallocation information can be sent to the UE by signaling, for example, on a control channel in order to achieve efficient radio resource utilization.

Figure 1:
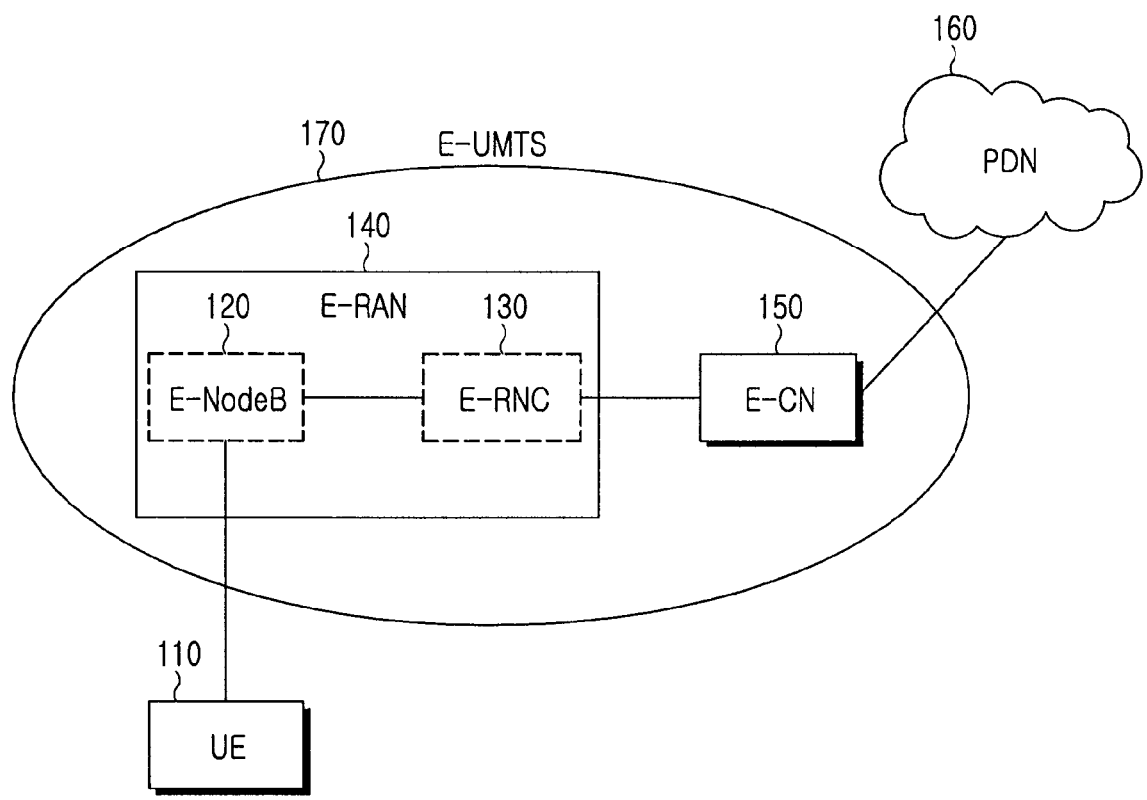
FIG. 1 illustrates the configuration of a 3GPP LTE system to which the present invention is applied.

FIG. 1 is an exemplary 3GPP LTE system which is a future-generation mobile communication system under discussion in the 3GPP standardization body, to which the present invention is applied, as a substitute for a 3G mobile communication standard, a Universal Mobile Telecommunication System (UMTS).

Referring to FIG. 1, a UE 110 is a 3GPP LTE terminal. An Evolved-Radio Access Network (E-RAN) 140 performs the functions of a Node B and a Radio Network Controller (RNC) of the conventional 3GPP system. The Node B is a radio device that directly participates in communications with a UE and manages cells. The RNC controls a plurality of Node Bs and radio resources. As with the conventional 3GPP system where the Node B and the RNC are configured as separate nodes, the E-RAN 140 can be configured as separate physical nodes, i.e. an Evolved-Node B (E-NB) 120 and an Evolved-RNC (E-RNC) 130, or can merge the E-NB 120 and the E-RNC 130 therein. Herein, the E-NB 120 and the E-RNC 130 are physically merged into the E-RAN 140. Yet, the following description also holds true in the former case.

An Evolved-Core Network (E-CN) 150 can be a node combining a Serving General Packet Radio Service (GPRS) Support Node (SGSN) and a Gateway GPRS Support Node (GGSN) of the conventional 3GPP system. The E-CN 150, which is located between a Packet Data Network (PDN) 160 and the E-RAN 140, allocates an Internet Protocol (IP) address to the UE 110 and functions as a gateway that connects the UE 110 to the PDN 160. For the definitions and functionalities of the SGSN and the GGSN, refer to www.3GPP.org. While the 3GPP LTE system illustrated in FIG. 1 will be referred to as an example of an OFDM wireless mobile communication system, it is to be understood that the present invention is also applicable to any other OFDM system.

The 3GPP standardization body defines two UE states, a Radio Resource Control (RRC) idle mode and an RRC connected mode. RRC is a control-plane layer in the E-RAN, for exchanging radio access-related control information between the UE and the E-RAN. In the RRC idle mode, the E-RAN does not have RRC context information about the UE and no control channel (i.e. no RRC connection) exists between the UE and the E-RAN. The RRC connected mode is a UE mode in which a control channel is established between the UE and the E-RAN and the E-RAN has the RRC context information about the UE.

The 3GPP LTE system can set a DRX period according to the activity level of the UE in the RRC connected mode. If data flows frequently occur for the UE, the UE continuously receives a channel. If few data flows are generated, a DRX period is set and the UE is allowed to receive the channel only during the DRX period without continuously receiving the channel. The use of DRX for the RRC connected mode-UE serves the purpose of efficient power use in the UE.

Figure 2:
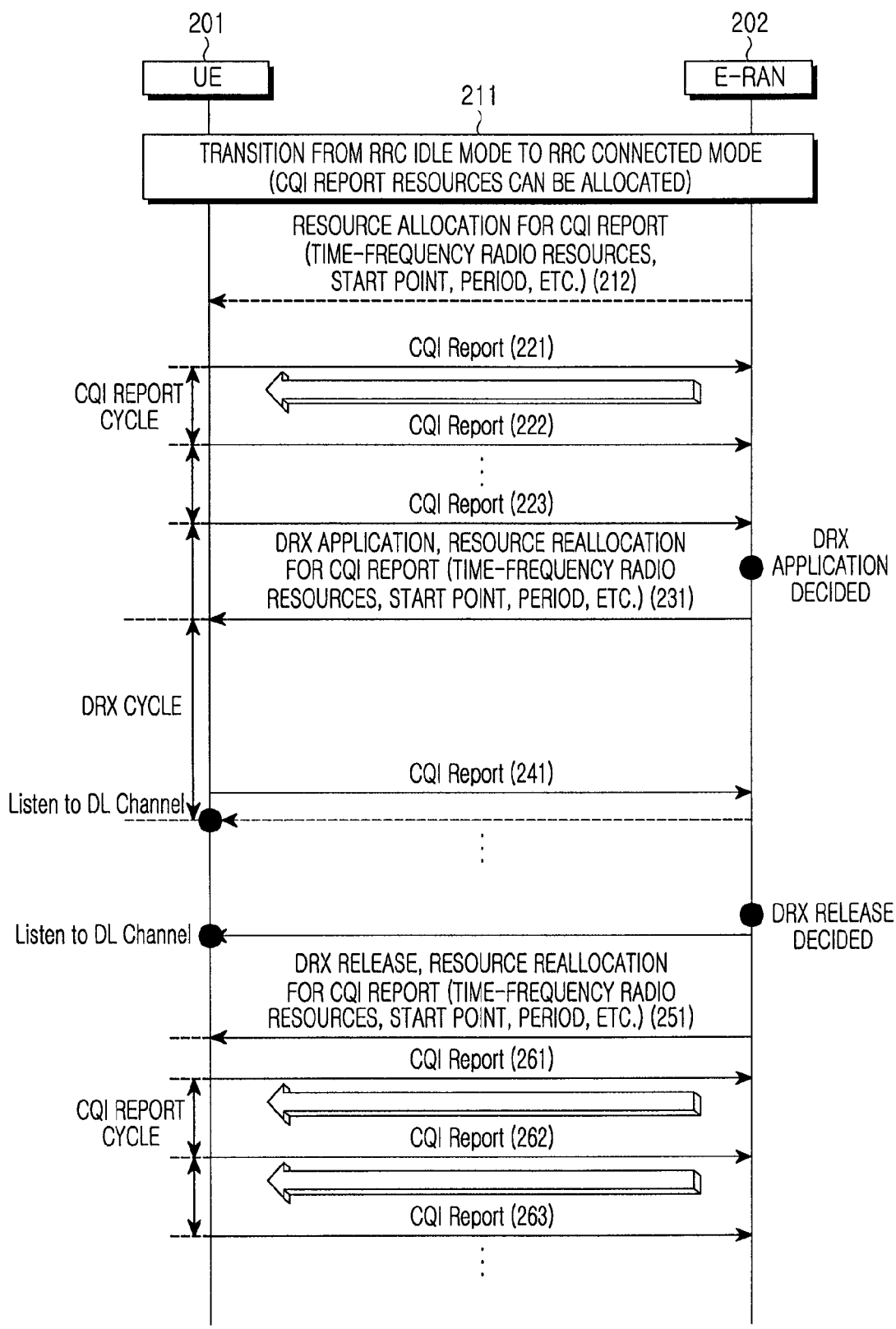
FIG. 2 illustrates an operation for reconfiguring CQI report resources for a UE when the UE transitions from a continuous channel reception state to a DRX channel reception state in an RRC connected mode.

FIG. 2 illustrates an operation for reconfiguring CQI report resources for a UE when the UE transitions from a continuous channel reception state to a DRX channel reception state in the RRC connected mode.

Referring to FIG. 2, reference numeral 201 denotes a UE and reference numeral 202 denotes an E-RAN. The UE 201 transitions from the RRC idle mode to the RRC connected mode in step 211. As a result, a control channel is established between the UE 201 and the E-RAN 202 and the E-RAN 202 has RRC context information about the UE 201. CQI report resources are notified to the UE 201 by separate signaling in step 211 or step 212. Information about the CQI report resources includes information about time-frequency resources, information about the start point of a CQI report, and a CQI report cycle. In steps 221, 222 and 223, the UE 201 reports CQI in CQI radio resources allocated in step 211 or step 212 in every CQI report cycle notified in step 211 or step 212.

If the E-RAN 202 decides to set a DRX period for the UE 201 according to the activity level of the UE 201, E-RAN 202 notifies the UE 201 of DRX application and in step 231 signals to the UE 201 CQI report resource reallocation information in relation to the DRX application. The UE 201 in step 241 reports CQI using CQI radio resources, a CQI report cycle, and a CQI report start point in the CQI report resource reallocation information. If the E-RAN 202 decides to release the DRX application from the UE 201, the E-RAN 202 in step 251 notifies the UE 201 of the DRX release and signals CQI report resource reallocation information in relation to the DRX release. The UE 201 reports CQI using CQI radio resources, a CQI report cycle, and a CQI report start point in the CQI report resource reallocation information in steps 261, 262 and 263. Typically, the E-RAN 202 decides on DRX application in the absence of a data flow with the UE 201 and decides on non-application of DRX in the presence of an active data flow with the UE 201.

As described above, each time the UE applies DRX or releases DRX according to its activity level, CQI report resource reallocation information should be signaled to the UE. If DRX is applied to a plurality of UEs in a cell and is released from them, CQI report resource reallocation information should be signaled to the UEs upon each transition between DRX application and DRX release, thereby causing a large signaling overhead.

Exemplary embodiments of the present invention define a rule for deriving CQI report resource information for use during DRX using CQI report resource information used before DRX application and DRX cycle information, instead of signaling CQI report resource reallocation information, when a UE transitions between DRX application and DRX release. According to the rule, the UE and an E-RAN can consistently maintain/manage CQI report resource reallocation information implicitly without explicit signaling.

While the present invention is described in the context of a 3GPP LTE system under discussion in the 3GPP as an exemplary mobile communication system, it is to be clearly understood that the present invention is also applicable to other mobile communication systems.

In accordance with an exemplary embodiment of the rule, when the UE transitions from a DRX release period to a DRX application period, the E-RAN retains a CQI report resource info context indicating CQI report resources allocated before the DRX application, and allocates to the UE CQI report resources used shortly before the DRX application when applying the context using DRX cycle information. Hence, CQI report resources of the UE previous to the allocated CQI report resources can be reallocated to other users.

For example, if DRX starts at a System Frame Number (SFN) of 200, a DRX cycle is 100 SFNs (i.e. the UE wakes up at SFNs of 300, 400, etc.), and a CQI report resource info context indicating CQI report resources used just before the DRX application is used, the E-RAN allocates CQI report resources used at SFNs of 290, 390, 490, etc., to the UE during DRX and may allocate resources for CQI report used for the UE at the other SFNs, in the case where CQI is supposed to be reported using time-frequency radio resources allocated at SFNs of 210, 230, 250, 270 and 290. Hence, radio resources can be efficiently utilized. If DRX application is signaled to the UE, the CQI report resource info context indicating CQI report resources used before the DRX application is preserved and the UE reports CQI using the CQI report resources previous to the DRX application, when the context is applied using DRX cycle information. In the above example, the UE reports CQI using the CQI report resources allocated only at the SFNs of 290, 390 and 490 before the DRX application.

If the DRX is released, the E-RAN and the UE reuse the CQI report resource info context indicating CQI report resources used during a DRX release period, stored before the DRX application, after the DRX release.

In accordance with the present invention, the above implicit CQI report resource allocation method can be used together with the explicit signaling-based CQI report resource allocation method illustrated in FIG. 2. Thus, if CQI report resource reallocation information is included in signaling regarding DRX application/release, CQI is reported according to the CQI report resource reallocation information. If the CQI report resource reallocation information is not included in the signaling regarding DRX application/release, CQI is reported according to the above-described rule.

Figure 3:
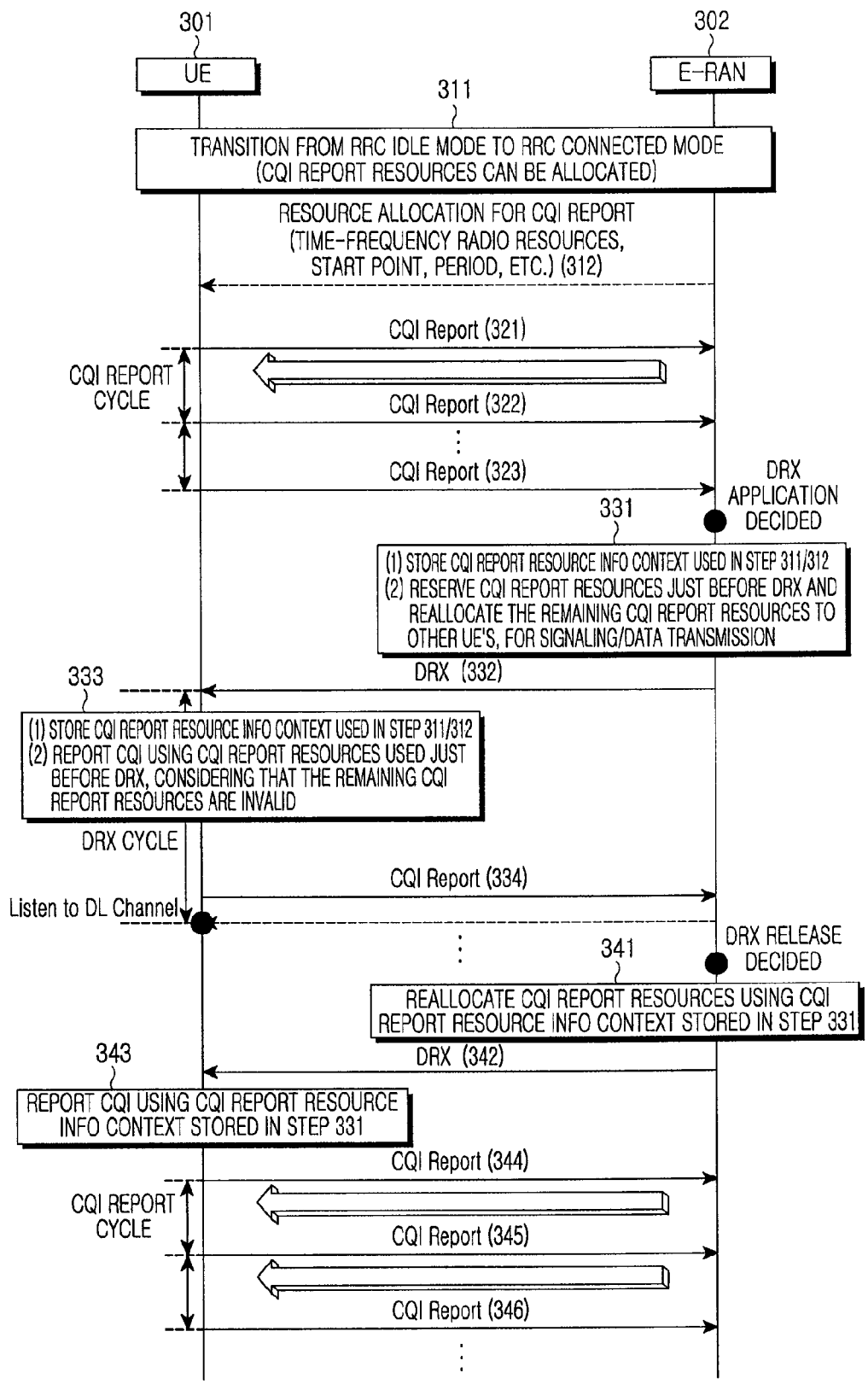
FIG. 3 illustrates an operation for reconfiguring CQI report resources for a UE when the UE transitions from a continuous channel reception state to a DRX channel reception state in an RRC connected mode according to an embodiment of the present invention.

FIG. 3 illustrates an operation for reconfiguring CQI report resources for a UE when the UE transitions between a DRX state and a continuous reception state in an RRC connected mode.

Referring to FIG. 3, reference numeral 301 denotes a UE and reference numeral 302 denotes an E-RAN. The UE 301 in step 311 transitions from RRC idle mode to RRC connected mode. As a result, a control channel is established between the UE 301 and the E-RAN 302 and the E-RAN 302 has RRC context information about the UE 301. The E-RAN 302 allocates CQI report resources to the UE 301 in step 312. Information about the allocated CQI report resources are sent to the UE 301 by separate signaling in step 311 or step 312. The CQI report resource allocation information includes information about time-frequency resources, information about the start point of a CQI report, and a CQI report cycle. In steps 321, 322 and 323, the UE 301 reports CQI to the E-RAN 302 in the allocated CQI radio resources according to the CQI report cycle.

If the E-RAN 302 decides to apply DRX for the UE 301 according to the activity level of the UE 301, in step 331 the E-RAN 302 preserves a CQI report resource info context indicating CQI report resources allocated in step 311 or step 312, and allocates the CQI report resources used just before the DRX application using the CQI report resource info context and DRX cycle information, while reallocating the other CQI report resources used before the DRX application to other users, for signaling or data transmission. That is, the original CQI report resources allocated to the UE 301 before the DRX application and a DRX cycle are calculated and the CQI report resources used just before the DRX application are maintained for the UE 301, while the other CQI report resources are reallocated to other users. Consequently, radio resources are efficiently utilized.

For example, if DRX starts at an SFN of 100 and a DRX cycle is 100, the UE wakes up at SFNs of 100, 200, 300, etc, for data reception. If CQI is supposed to be reported at SFNs of 110, 130, 150, 170, 190, 210, 230, 250, 270, 290, 310, etc. using allocated time-frequency radio resources according to a CQI report resource info context used before DRX application, the E-RAN 302 maintains for the UE 301 the CQI report radio resources allocated at the SFN 190 just before the SFN 200 and the CQI report radio resources allocated at the SFN 290 just before the SFN 300, while reallocating the other CQI report radio resources allocated at the SFNs 110, 130, 150, 170, 210, 230, 250, 270, 310, etc. to other users. In the above example, Connection Frame Numbers (CFNs) may substitute for SFNs. The SFNs and CFNs may comply with 3GPP standards.

In step 332, the E-RAN 302 notifies the UE 301 of the DRX application by signaling. In accordance with the resource reallocation method of the present invention, there is no need for including CQI report resource reallocation information in the signaling because the E-RAN 302 and the UE 301 have agreed on CQI report resources for use in DRX. In step 333, the UE 301 preserves a CQI report resource info context indicating CQI report resources allocated in step 311 or step 312 and reports CQI in the CQI report resources used just before the DRX application according to the CQI report resource info context and DRX cycle information, considering that the other previous CQI report resources are not used for the UE 301. That is, the original CQI report resources allocated to the UE 301 before the DRX application and a DRX cycle are calculated and the CQI report resources used just before the DRX application are maintained for the UE 301, while the other CQI report resources are reallocated to other users.

For example, if DRX starts at an SFN of 100 and a DRX cycle is 100, the UE wakes up at SFNs of 100, 200, 300, etc. If CQI is supposed to be reported at SFNs of 110, 130, 150, 170, 190, 210, 230, 250, 270, 290, 310, etc. using allocated time-frequency radio resources according to a CQI report resource info context used before DRX application, the UE 301 reports CQI using the CQI report radio resources allocated at the SFN 190 and the SFN 290, considering that the other CQI report radio resources allocated at the SFNs 110, 130, 150, 170, 210, 230, 250, 270, 310, etc. are not used for the UE 301 any longer. In this example, CFNs may substitute for SFNs. The SFNs and CFNs may comply with 3GPP standards.

In step 334, the UE 301 applies DRX and reports CQI to the E-RAN 302 using CQI report resources used just before the DRX application, which are calculated using a CQI report resource info context used before the DRX application and the DRX cycle information.

If the E-RAN 302 decides to release the UE 301 from the DRX mode, in step 341 341reallocates the CQI report resources allocated in step 311 or step 312 before the DRX application according to the CQI report resource info context preserved since step 331. In step 342, the E-RAN 302 notifies the UE 301 of the DRX release. When the implicit CQI report allocation method of the present invention is used, there is no need for sending CQI report resource reallocation information to the UE 301 in step 342 because the E-RAN 302 and the UE 301 have agreed on CQI report resources for use in the case of the DRX release. If receiving in step 342 a signal indicating the DRX release, the UE 301 reports CQI using the CQI report resources allocated in step 311 or step 312 before the DRX application after the DRX release in steps 344, 345 and 346. Here, the CQI report cycle is identical to that of CQI reports in steps 321, 322 and 323.

While not shown in FIG. 3, the present invention can be used in combination with a conventional method. That is, if CQI report resource reallocation information is explicitly signaled in step 332 or step 342, the UE 301 reports CQI according to the CQI report resource reallocation information. If the report resource reallocation information is not signaled in step 332 or step 342, the UE 301 reports CQI according to the CQI report resource reallocation rule between the UE 301 and the E-RAN 302.

In this way, when the UE transitions between a continuous channel reception state and a DRX state in the RRC connected mode, the UE can report CQI according to the defined CQI report resource reallocation rule without the overhead of signaling new CQI report resource reallocation information.

Figure 4:
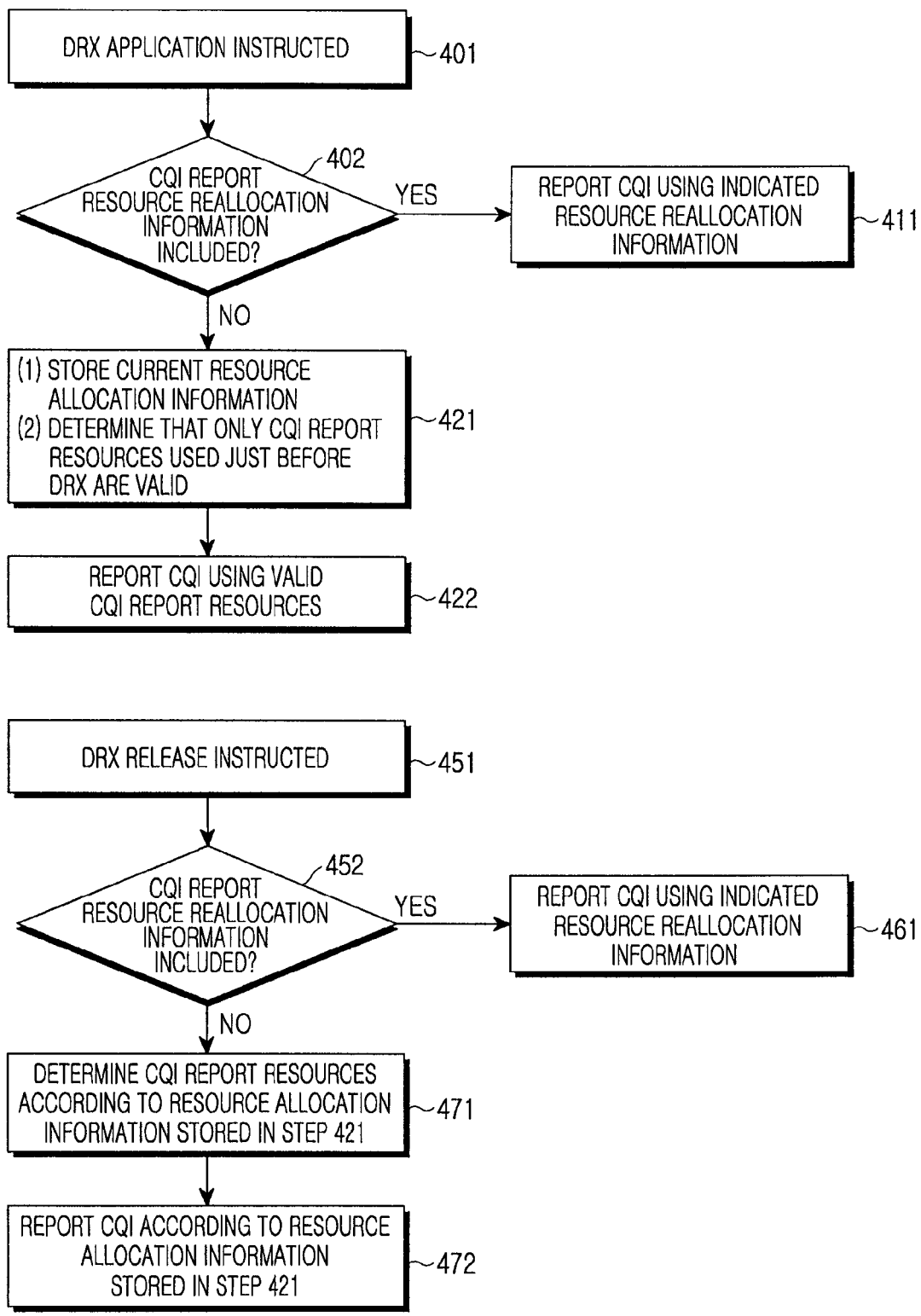
FIG. 4 is a flowchart illustrating an operation of the UE according to an embodiment of the present invention.

FIG. 4 is a flowchart illustrating an operation of the UE according to an exemplary embodiment of the present invention. In the illustrated case of FIG. 4, the present invention is used in combination with the conventional explicit CQI report resource reallocation method.

Referring to FIG. 4, in step 401 the UE receives from the E-RAN a signal indicating DRX application, and in step 402determines whether CQI report resource reallocation information is included in the signal. In the presence of the CQI report resource reallocation information, the UE reports CQI according to the CQI report resource reallocation information in step 411. In the absence of the CQI report resource reallocation information, in step 421 the UE maintains a CQI report resource info context used before receiving the signal indicating the DRX application and calculates CQI report resources allocated just before the DRX application. The UE considers that only the calculated CQI report resources are for a CQI report and the other CQI report resources are invalid. In step 422, the UE reports CQI using the valid CQI report resources.

During the DRX, DRX release is instructed to the UE by the E-RAN in step 451. The UE in step 452 determines whether CQI report resource reallocation information is included in the signaling of step 451. In the presence of the CQI report resource reallocation information, in step 461 the UE reports CQI according to the CQI report resource reallocation information. In the absence of the CQI report resource reallocation information, in step 471 the UE considers that the CQI report resources used before the DRX application are valid and in step 472 reports CQI using the preserved CQI report resource info context.

Figure 5:
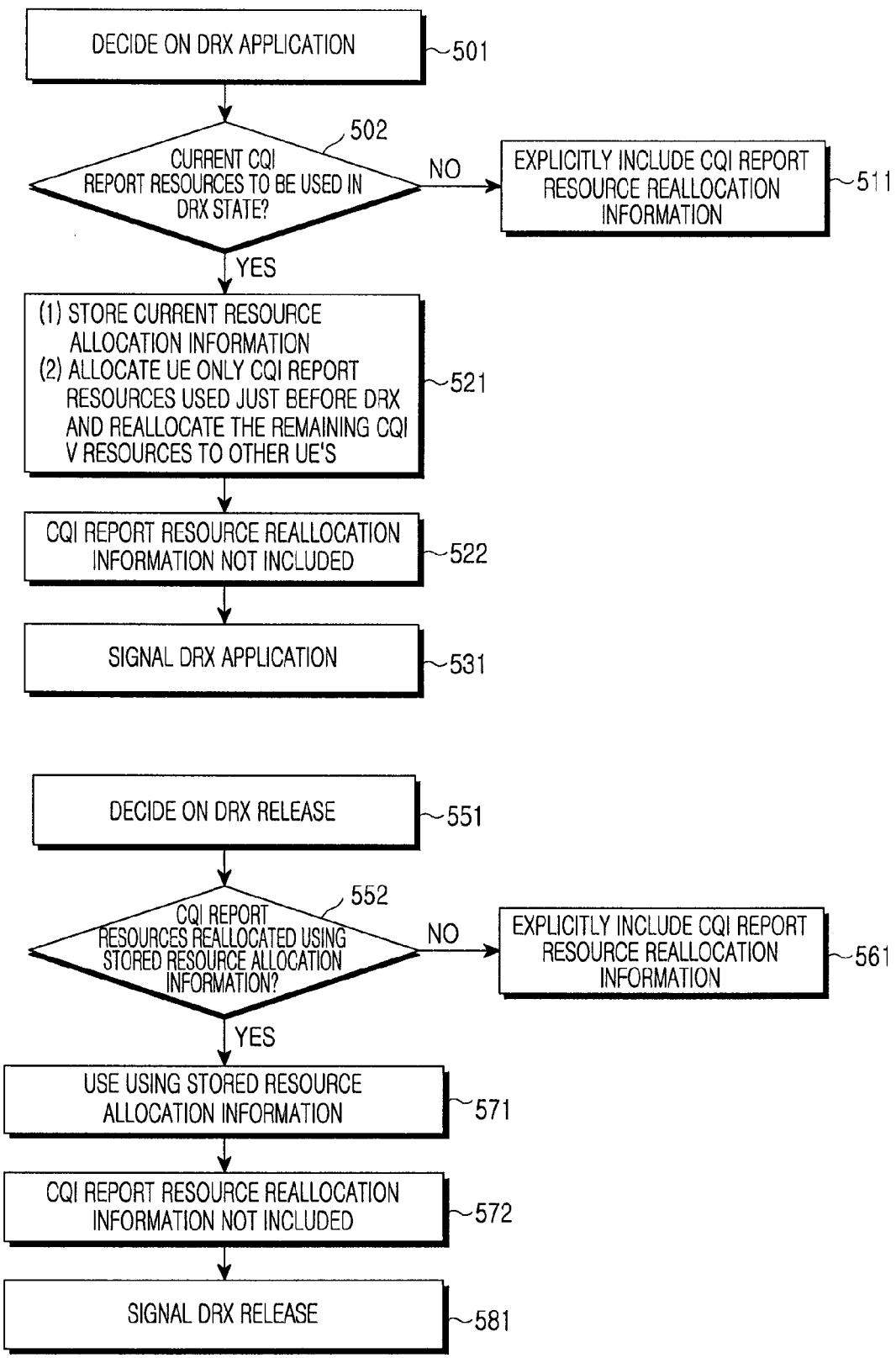
FIG. 5 is a flowchart illustrating an operation of an E-RAN according to an embodiment of the present invention.

FIG. 5 is a flowchart illustrating an operation of the E-RAN according to an exemplary embodiment of the present invention. In the illustrated case of FIG. 5, the CQI report resource reallocation method of the present invention is used together with the conventional CQI report resource reallocation method.

Referring to FIG. 5, in step 501 the E-RAN decides to apply DRX to a particular UE. In general, if a data flow to/from the UE does not temporarily exist, DRX is applied to the UE. In step 502, the E-RAN determines whether to apply the present invention to the conventional method. In the latter case, the E-RAN explicitly includes CQI report resource reallocation information in step 511. In the former case, in step 521 the E-RAN preserves a CQI resource info context indicating CQI report resources allocated to the UE before the DRX application and continues allocating the CQI report resources to the UE according to DRX cycle information and the context, while reallocating the other CQI report resources used for the UE to other users. In step 522, the E-RAN does not include CQI report resource reallocation information. In step 531, the E-RAN signals DRX application to the UE.

In step 551, the E-RAN decides to release the UE from the DRX state. The E-RAN in step 552 determines whether to use the preserved CQI report resource info context to reallocate CQI report resources. If it is determined to reallocate CQI report resources irrespective of the context, in step 561 the E-RAN explicitly includes CQI report resource reallocation information for use after the DRX release. If it is determined to reallocate CQI report resources using the context, the E-RAN in step 571 uses the context and in step 572 does not include CQI report resource reallocation information. In step 581, the E-RAN signal the DRX release to the UE.

Figure 6:
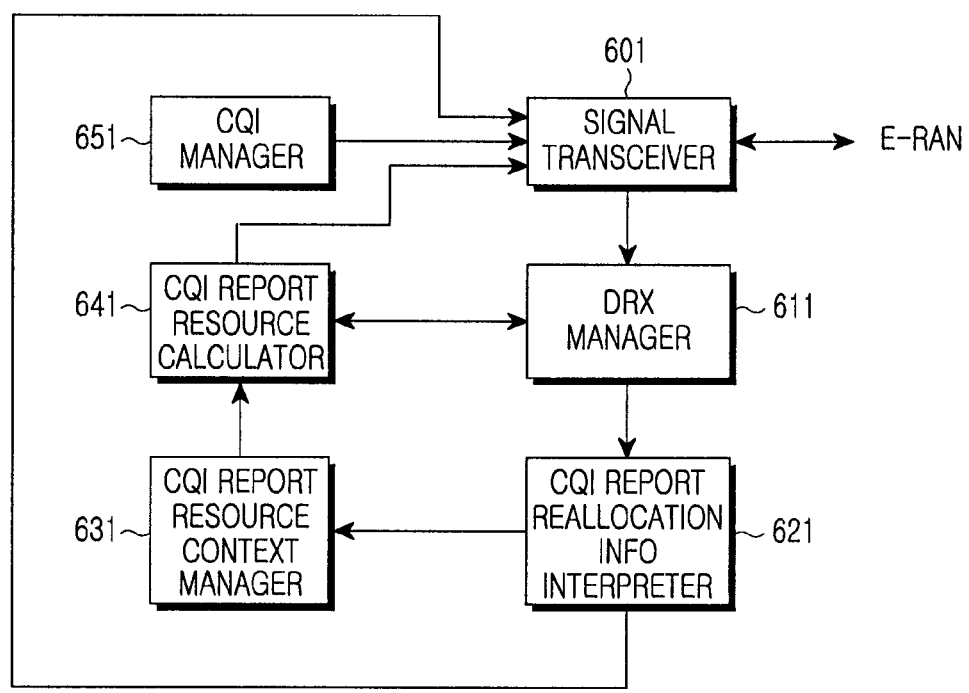
FIG. 6 is a block diagram of the UE according to an embodiment of the present invention.

FIG. 6 is a block diagram of the UE according to an exemplary embodiment of the present invention. In the illustrated case of FIG. 6, the present invention is used in combination with the conventional explicit CQI report resource reallocation method.

Referring to FIG. 6, a signal transceiver 601 receives a signal from the E-RAN or sends to the E-RAN a signal including, for example, a CQI report. A DRX manager 611 determines whether a signal received from the signal transceiver 601 indicates that the E-RAN has instructed DRX application or DRX release and manages related DRX cycle information. A CQI report resource reallocation info interpreter 621 determines whether the signal indicating DRX application or DRX release explicitly includes CQI report resource reallocation information. If the signal indicating DRX application or DRX release explicitly includes CQI report resource allocation information, the CQI report resource reallocation info interpreter 621 reports CQI according to the explicit CQI report resource reallocation information.

If the signal indicating DRX application or DRX release does not explicitly include the CQI report resource reallocation information, a CQI report resource calculator 641 calculates CQI report resources for the UE using a CQI report resource info context used before DRX application, received from a CQI report resource context manager 631 and DRX cycle information received from the DRX manager 611. If the signal received from the signal transceiver 601 indicates the DRX application, only CQI report resources used just before the DRX application from among previous CQI report resources before the DRX application will be used. If the signal indicates the DRX release, CQI is reported with the CQI report resources used before the DRX application.

A CQI measurer 651 measures CQI and signals CQI on the uplink through the signal transceiver using the CQI report resources indicated by the CQI report resource reallocation info interpreter 621.

Figure 7:
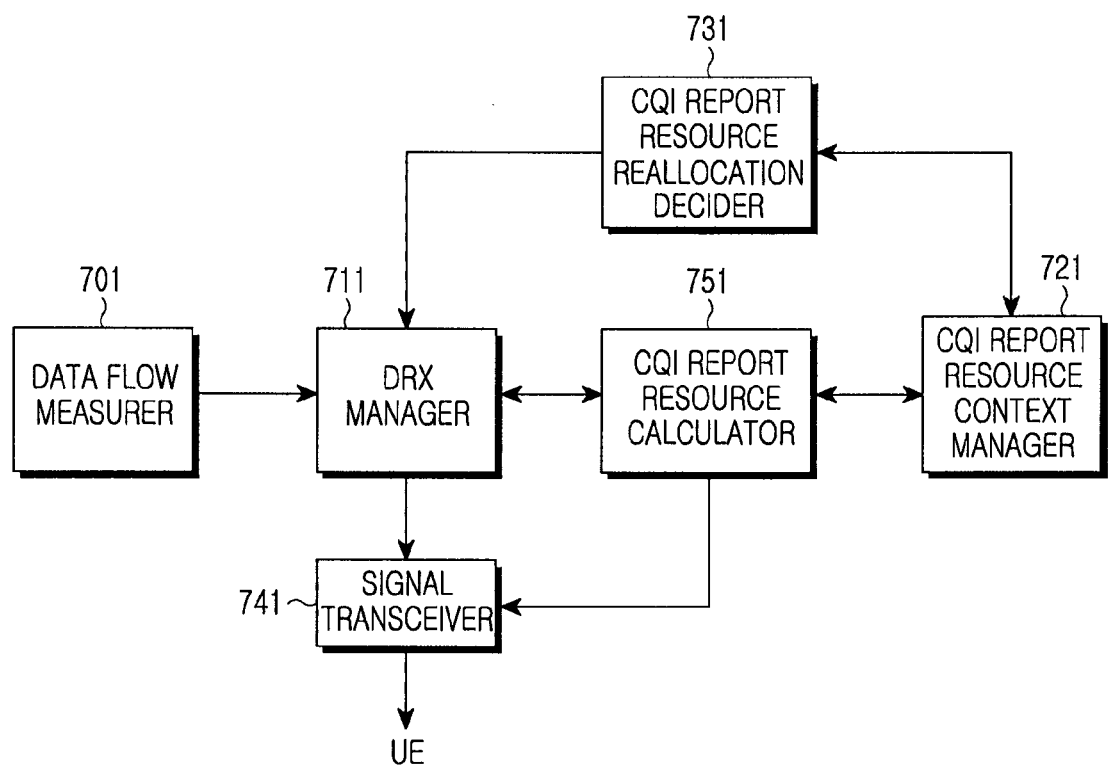
FIG. 7 is a block diagram of the E-RAN according to an embodiment of the present invention.

FIG. 7 is a block diagram of the E-RAN according to an exemplary embodiment of the present invention. In the illustrated case of FIG. 7, the present invention is used in combination with the conventional explicit CQI report resource reallocation method.

Referring to FIG. 7, a data flow measurer 701 measures the data flow of the UE. A DRX manager 711 determines whether to apply or release DRX for the UE according to the data flow measurement and when it is determined to apply DRX, the data flow measurer 701 sets DRX cycle information. A CQI report resource reallocation decider 731 determines whether to use a CQI report resource info context for the UE before DRX application or to reallocate new CQI report resources. If the CQI report resource reallocation decider 731 decides to allocate new CQI report resources, CQI report resource reallocation information is explicitly included in a signal indicating DRX application or DRX release. If the CQI report resource reallocation decider 731 decides to reuse the CQI report resource info context, the CQI report resource reallocation information is not included in the signal indicating DRX application or DRX release. If the CQI report resource info context is reused and a signal received from the DRX manager 711 indicates DRX application, a signal transceiver 741 preserves CQI report resources used just before the DRX application, received from a CQI report resource calculator 751 and the DRX cycle information received from the DRX manager 711 and receives a CQI report from the UE in the preserved CQI report resources. Other CQI report resources before the DRX application than the CQI report resources just before the DRX application can be reallocated to other UEs. If the CQI report resource info context is reused and the signal received from the DRX manager 711 indicates DRX release, the signal transceiver 741 receives a CQI report from the UE using the CQI report resource info context after the DRX release.

As is apparent from the above description, when a UE transitions between a continuous reception state and a DRX state in RRC connected mode, information regarding newly allocated resources is not signaled to the UE in a wireless communication system. Therefore, signaling overhead is reduced and resources are efficiently allocated.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting Channel Quality Information (CQI) in a wireless communication system, the method comprising:
   receiving, by a mobile station, CQI report resource information, CQI period information, and Discontinuous Reception (DRX) cycle information;
   discontinuously monitoring, by the mobile station, a channel based on the DRX cycle information; and
   reporting a CQI to a network, based on the CQI report resource information, the CQI period information, and the DRX cycle information.

2. The method of claim 1, further comprising reporting the CQI to the network, based on the resource information and the period information, if the DRX cycle information is not received.

3. The method of claim 1, wherein a first CQI is transmitted at a time duration related to a wakeup duration determined by the DRX cycle information among time durations determined by the CQI period information, if the DRX cycle information is received.

4. The method of claim 1, wherein the CQI report resource information includes offset information associated with a transmission time of the CQI.

5. A method for receiving Channel Quality Information (CQI) in a wireless communication system, the method comprising:
   transmitting, by a network, CQI report resource information, CQI period information, and Discontinuous Reception (DRX) cycle information; and
   receiving, by the network, a CQI from a mobile station, based on the CQI report resource information, the CQI period information, and the DRX cycle information.

6. The method of claim 5, further comprising receiving the CQI from the mobile station, based on the resource information and the period information, if DRX information is not transmitted.

7. The method of claim 5, wherein a first CQI is received at a time duration related to a wakeup duration determined by the DRX cycle information among time durations determined by the CQI period information, if the DRX cycle information is transmitted.

8. The method of claim 5, wherein the CQI report resource information includes offset information associated with a transmission time of the CQI.

9. An apparatus for transmitting Channel Quality Information (CQI) in a wireless communication system, the apparatus comprising:
   a transceiver configured to receive CQI report resource information, CQI period information, and Discontinuous Reception (DRX) cycle information, and to report a CQI to a network, based on the CQI report resource information, the CQI period information, and the DRX cycle information; and
   a controller configured to discontinuously monitor a channel, based on the DRX cycle information, and to control the transceiver.

10. The apparatus of claim 9, wherein the transceiver is further configured to report the CQI to the network, based on the resource information and the period information, if the DRX cycle information is not received.

11. The apparatus of claim 9, wherein a first CQI is transmitted at a time duration related to a wakeup duration determined by the DRX cycle information among time durations determined by the CQI period information, if the DRX cycle information is received.

12. The apparatus of claim 9, wherein the CQI report resource information includes offset information associated with a transmission time of the CQI.

13. An apparatus for receiving Channel Quality Information (CQI) in a wireless communication system, the apparatus comprising:
   a transceiver configured to transmit CQI report resource information, CQI period information, and Discontinuous Reception (DRX) cycle information, and to receive a CQI from a mobile station based on the CQI report resource information, the CQI period information, and the DRX cycle information; and
   a controller configured to control the transceiver.

14. The apparatus of claim 13, wherein the transceiver is further configured to receive the CQI from the mobile station, based on the resource information and the period information, if DRX information is not transmitted.

15. The apparatus of claim 13, wherein a first CQI is received at a time duration related to a wakeup duration determined by the DRX cycle information among time durations determined by the CQI period information, if the DRX cycle information is transmitted.

16. The apparatus of claim 13, wherein the CQI report resource information includes offset information associated with a transmission time of the CQI.

\* \* \* \* \*